United States Patent [19]

Kanbe et al.

[11] Patent Number: 4,712,873
[45] Date of Patent: Dec. 15, 1987

[54] LIQUID CRYSTAL OPTICAL DEVICE

[75] Inventors: Junichiro Kanbe, Yokohama; Shinjiro Okada, Kawasaki, both of Japan

[73] Assignee: Canon Kabushiki Kaisha, Tokyo, Japan

[21] Appl. No.: 720,084

[22] Filed: Apr. 4, 1985

[30] Foreign Application Priority Data

Apr. 16, 1984 [JP] Japan ................................. 59-76819

[51] Int. Cl.⁴ ............................................. G02F 1/13
[52] U.S. Cl. ................................. 350/337; 350/350 S
[58] Field of Search ............... 350/350 S, 330, 331 T, 350/333, 337

[56] References Cited

U.S. PATENT DOCUMENTS

| | | | |
|---|---|---|---|
| 3,936,815 | 2/1976 | Kogure et al. | 350/333 X |
| 3,955,187 | 5/1976 | Bigelow | 350/333 X |
| 4,256,787 | 3/1981 | Shaver et al. | 350/337 X |
| 4,367,924 | 1/1983 | Clark et al. | 350/350 S X |
| 4,541,690 | 9/1985 | Clerc | 350/333 |
| 4,561,726 | 12/1985 | Goodby et al. | 350/350 S X |

OTHER PUBLICATIONS

Applied Physics Lett. 36(11), Jun. 1980, Clark et al., pp. 899 to 901.

Primary Examiner—Donald A. Griffin
Attorney, Agent, or Firm—Fitzpatrick, Cella, Harper & Scinto

[57] ABSTRACT

A liquid crystal optical device comprising a pair of base plates each provided with an electrode, a ferroelectric liquid crystal sealed between the pair of base plates and at least one polarizer, wherein the ferroelectric liquid crystal provides a different monoaxially anisotropic phase having an axial direction through phase transition thereof, the ferroelectric liquid crystal gives an average molecular axis direction forming an angle (H) from the axial direction of the different monoaxially anisotropic phase under application of a polarity of voltage, the ferroelectric liquid crystal further gives an average molecular axis direction forming an angle $\theta$ from the axial direction of the different monoaxially anisotropic phase under the application of zero-voltage between the electrodes of the pair of base plates, the angle (H) being smaller than $\theta$, and one of the at least one polarizer is so arranged that the polarizing axis thereof is in substantially parallel with the average molecular axis direction giving the angle $\theta$ of the ferroelectric liquid crystal.

30 Claims, 30 Drawing Figures

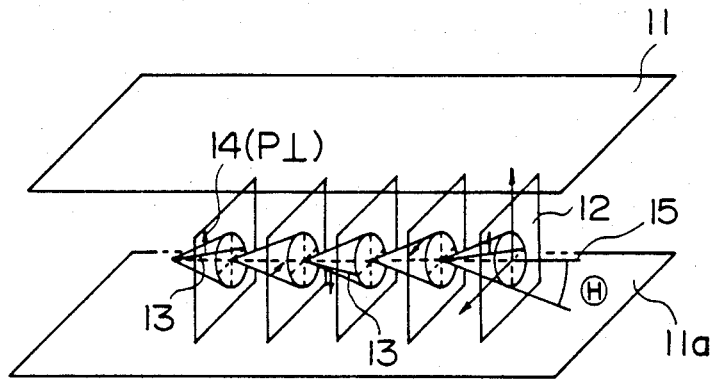
F I G. 1
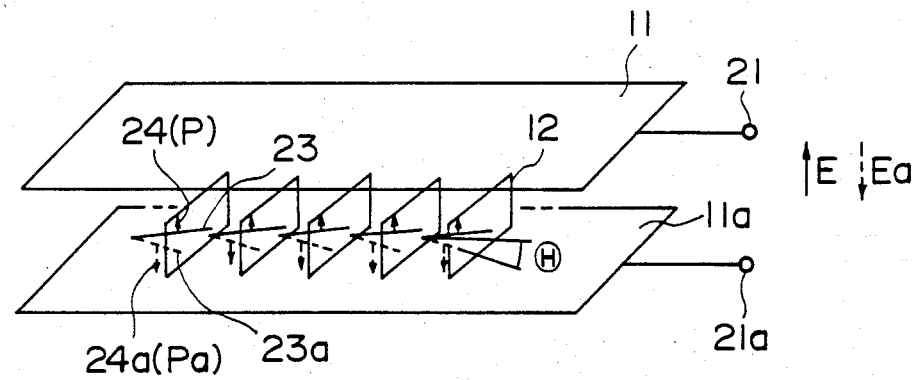
F I G. 2

LIQUID CRYSTAL OPTICAL DEVICE

BACKGROUND OF THE INVENTION

The present invention relates to a liquid crystal device for use in a liquid crystal display device, an optical shutter array, etc., and more particularly to a liquid crystal device having improved display and driving characteristics, because of improved initial alignment or orientation of liquid crystal molecules.

Hitherto, liquid crystal display devices are well known which are comprised of a group of scanning electrodes and a group of signal electrodes arranged in a matrix manner, and a liquid crystal compound filled between the electrode groups to form a plurality of picture elements to thereby display images or information. These display devices employ a timesharing driving method which comprises the steps of selectively applying address signals sequentially and cyclically to the group of scanning electrodes, and in parallel effecting selective application of predetermined information signals to the group of signal electrodes in synchronism with the address signals. However, these display devices and the driving method therefor have a serious drawback as will be described below.

Namely, the drawback is that it is difficult to obtain a high density of picture elements or a large image area. Because of relatively high response speed and low power dissipation, prior art liquid crystals which have been put into practice as display devices are TN (twisted nematic) type liquid crystals, as shown in "Voltage-Dependent Optical Activity of a Twisted Nematic Liquid Crystal" by M. Schadt and W. Helfrich, Applied Physics Letters Vol. 18, No. 4 (Feb. 15, 1971), pp. 127–128. In the liquid crystals of this type, molecules of nematic liquid crystal which show positive dielectric anisotropy under no application of an electric field form a structure twisted in the thickness direction of liquid crystal layers (helical structure), and molecules of these liquid crystals are aligned or oriented parallel to each other in the surfaces of both electrodes. On the other hand, nematic liquid crystals which show positive dielectric anisotropy under application of an electric field are oriented or aligned in the direction of the electric field. Thus, they can cause optical modulation. When display devices of a matrix electrode array are designed using liquid crystals of this type, a voltage higher than a threshold level required for aligning liquid crystal molecules in the direction perpendicular to electrode surfaces is applied to areas (selected points) where scanning electrodes and signal electrodes are selected at a time, whereas a voltage is not applied to areas (non-selected points) were scanning electrodes and signal electrodes are not selected and, accordingly, the liquid crystal molecules are stably aligned parallel to the electrode surfaces. When linear polarizers arranged in a cross-nicol relationship, i.e., with their polarizing axes being substantially perpendicular to each other, are arranged on the upper and lower sides of a liquid crystal cell thus formed, light does not transmit at selected points while it transmits at non-selected points. Thus, the liquid crystal cell can function as an image device.

However, when a matrix electrode structure is constituted, a certain electric field is applied to regions where scanning electrodes are selected and signal electrodes are not selected or regions where scanning electrodes are not selected and signal electrodes are selected (which regions are so-called "half-selected points"). If the difference between a voltage applied to the selected points and a voltage applied to the half-selected points is sufficiently large, and a voltage threshold level required for allowing liquid crystal molecules to be aligned or oriented perpendicular to an electric field is set to a value therebetween, the display device normally operates. However, in fact, as the number (N) of scanning lines increases, a time (duty ratio) during which an effective electric field is applied to one selected point when a whole image area (corresponding to one frame) is scanned decreases with a ratio of 1/N. For this reason, the larger the number of scanning lines, the smaller is the voltage difference as an effective value applied to a selected point and nonselected points when scanning is repeatedly effected. As a result, this leads to unavoidable drawbacks of lowering of image contrast or occurrence of crosstalk. These phenomena result in problems that cannot be essentially avoided, which appear when a liquid crystal not having bistability (which shows a stable state where liquid crystal molecules are oriented or aligned in a horizontal direction with respect to electrode surfaces, but are oriented in a vertical direction only when an electric field is effectively applied) is driven, i.e., repeatedly scanned, by making use of time storage effect. To overcome these drawbacks, the voltage averaging method, the two-frequency driving method, the multiple matrix method, etc., have already been proposed. However, these methods are not sufficient to overcome the above-mentioned drawbacks. As a result, it is the present state that the development of large image area or high packaging density in respect to display elements is delayed because of the fact that it is difficult to sufficiently increase the number of scanning lines.

Meanwhile, turning to the printer field, as means for obtaining a hard copy in response to input electric signals, a Laser Beam Printer (LBP) providing electric image signals to electrophotographic charging member in the form of lights is the most excellent in view of density of a picture element and printing speed.

However, the LBP has drawbacks as follows:
(1) It becomes large in apparatus size.
(2) It has high speed mechanically movable parts such as a polygon scanner, resulting in noise and requirement for strict mechanical precision, etc.

In order to eliminate the drawbacks stated above, a liquid crystal shutter-array is proposed as a device for changing electric signals to optical signals. When picture element signals are provided with a liquid crystal shutter-array, however, more than 4000 signal generators are required, for instance, for writing picture element signals into a length of 200 mm in a ratio of 20 dots/mm. Accordingly, in order to independently feed signals to respective signal generators, lead lines for feeding electric signals are required to be provided to all the respective signal generators, and the production has become difficult.

In view of this, another attempt is made to apply one line of image signals in a time-sharing manner with signal generators divided into a plurality of lines.

With this attempt, signal feeding electrodes can be common to the plurality of signal generators, thereby enabling a remarkable decrease in the number of lead wires. However, if the number (N) of lines is increased while using a liquid crystal showing no bistability as usually practised, a signal "ON" time is substantially reduced to 1/N. This results in difficulties that light quantity obtained on a photoconductive member is decreased, and a crosstalk occurs.

In order to obviate the above-mentioned drawbacks of the conventional types of liquid crystal devices, Clark and Lagerwall have proposed the use of a liquid crystal device using a bistable liquid crystal (Japanese Laid-Open Patent Application No. 107216/1981, U.S. Pat. No. 4,367,924, etc.). As the bistable liquid crystal, a ferroelectric liquid crystal having a chiral smectic C (SmC*) phase or H (SmH*) phase is generally used. The ferroelectric liquid crystal has bistability, i.e., has two stable states comprising a first stable state and a second stable state. Accordingly, different from the conventional TN-type liquid crystal in the above-mentioned device, the liquid crystal is oriented to the first stable state in response to one electric field vector and to the second stable state in response to the other electric field vector. Further this type of liquid crystal very quickly assumes either one of the above-mentioned two stable states in response to an electric field applied thereto and retains the state in the absence of an electric field. By utilizing these properties, essential improvements can be attained with respect to the above-mentioned difficulties involved in the conventional TN-type liquid crystal device. This point will be explained in further detail in connection with the present invention.

However, in order that an optical modulation device using the liquid crystal having bistability could show desired operation performances, the liquid crystal interposed between a pair of parallel base plates is required to be placed in such a state of molecular arrangement that the transition between the two stable states can effectively occur, as a matter different from or a precondition of the application of an electric field. With respect to, for example, a ferroelectric liquid crystal having an SmC* or SmH* phase, there must be formed a monodomain wherein the layers of the liquid crystal are perpendicular to the face of the base plate and therefore the molecular axis of the liquid crystal is almost in parallel with the base plate face. However, in the optical modulation devices using a bistable liquid crystal provided heretofore, an orientation state of a liquid crystal having such a monodomain structure cannot satisfactorily be formed, whereby the optical modulation device cannot actually show sufficient performances.

For example, several methods have been proposed by Clark et al to give such an orientation state, including a method of applying a magnetic field, and a method of applying a shearing force. These methods have not necessarily provided satisfactory results. For example, the method of applying a magnetic field requires a large size of apparatus and is not readily compatible with a thin layer cell which is generally excellent in operation performances. The method of applying a shearing force is not compatible with a method where a cell structure is first formed and then a liquid crystal is poured thereinto.

SUMMARY OF THE INVENTION

A principal object of the present invention is, in view of the above-mentioned circumstances, to provide a liquid crystal optical device capable of realizing a display device or a high speed shutter device having a high-speed response characteristic, a high picture element density and a large picture area by providing a specific bistable states at a good productivity and combining the specific stable states and a polarizer.

Thus, according to the present invention, there is provided a liquid crystal optical device comprising a pair of base plates each provided with an electrode, a ferroelectric liquid crystal sealed between the pair of base plates and at least one polarizer, wherein the ferroelectric liquid crystal provides a different monoaxially anisotropic phase having an axial direction through phase transition thereof, the ferroelectric liquid crystal gives an average molecular axis direction forming an angle Ⓗ from the axial direction of the different monoaxially anisotropic phase under application of a polarity of voltage, the ferroelectric liquid crystal further gives an average molecular axis direction forming an angle $\theta$ from the axial direction of the different monoaxially anisotropic phase under the application of zero-voltage between the electrodes of the pair of base plates, the angle $\theta$ being smaller than Ⓗ, and one of the at least one polarizer is so arranged that the polarizing axis thereof is substantially parallel with the average molecular axis direction giving the angle $\theta$ of the ferroelectric liquid crystal.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are schematic perspective views illustrating the basic operation principle of a liquid crystal cell used in the present invention;

DESCRIPTION OF THE PREFERRED EMBODIMENTS

Figure 3A:
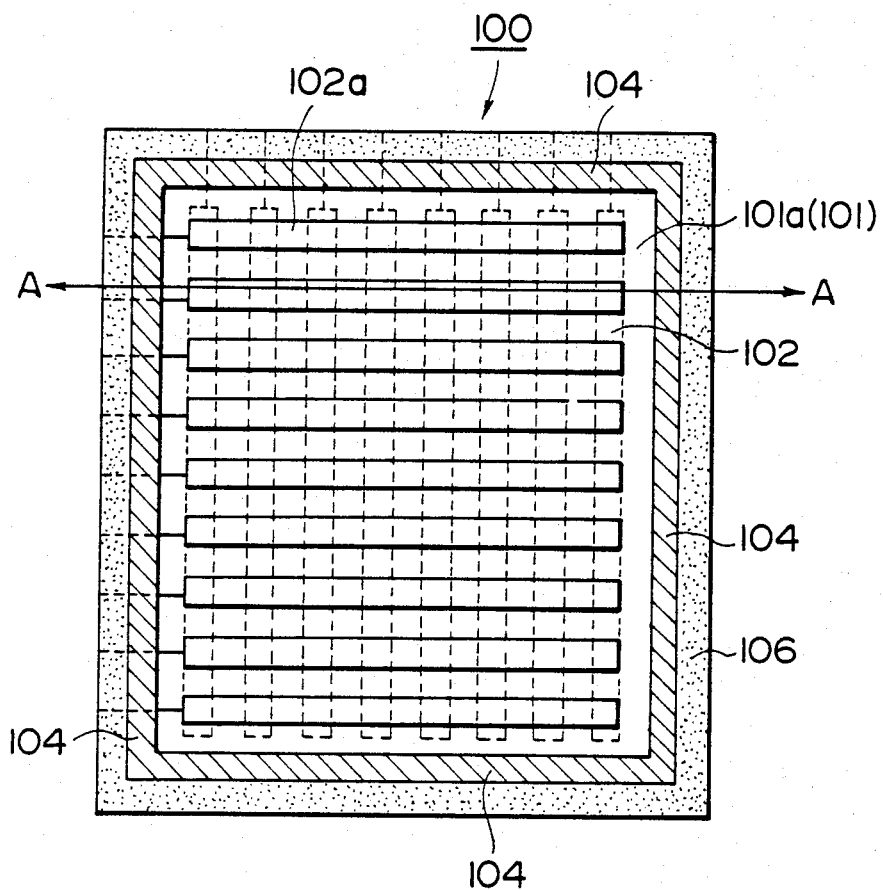
FIG. 3A is a plan view showing an embodiment of the liquid crystal optical device according to the present invention.

Liquid crystal materials most suited for the present invention are chiral smectic liquid crystals showing ferroelectricity. More specifically, liquid crystals showing chiral smectic C phase (SmC*), H phase (SmH*), I phase (SmI*), J phase (SmJ*), K phase (SmK*), G phase (SmG*), or F phase (SmF*) are available.

Details of ferroelectric liquid crystals are described in, e.g., "LE JOURNAL DE PHYSIQUE LETTERS" 36 (L-69) 1975, "Ferroelectric Liquid Crystals"; "Applied Physics Letters" 36 (11) 1980, "Submicro Second Bistable Electrooptic Switching in Liquid Crystals"; Kotai Butsuri (Solid State Physics) 16 (141) 1981, "Liquid Crystals", etc. In the present invention, ferroelectric liquid crystals disclosed in these publications may be used.

Examples of ferroelectric liquid crystal compounds include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresorcylidene-4'-octylaniline (MBRA 8), etc. Especially preferred class of chiral smectic liquid crystals used in the liquid crsytal device according to the present invention are those showing a cholesteric phase at a temperature higher than the temperature for giving a smectic phase. A specific example of such chiral smectic liquid crystal is a biphenyl ester type liquid crystal compound showing phase transition temperatures as shown in an example described hereinafter.

When a device is constituted using these materials, the device may be supported with a block of copper, etc., in which a heater is embedded in order to realize a temperature condition where the liquid crystal compounds assume a desired phase.

Referring to FIG. 1, there is schematically shown an example of a ferroelectric liquid crystal cell for explanation of the operation thereof. An example where an SmC* phase constitutes a desired phase is explained. Reference numerals 11 and 11a denote base plates (glass plates) on which a transparent electrode of, e.g., $In_2O_3$, $SnO_2$, ITO (Indium-Tin Oxide), etc., is disposed, respectively. A liquid crystal of an SmC*-phase in which liquid crystal molecular layers 12 are oriented perpendicular to surfaces of the glass plates is hermetically disposed therebetween. A full line 13 shows liquid crystal molecules. The liquid crystal molecules 13 continuously form a helical structure in the direction of extension of the base plates. The angle formed between the central axis 15 and the axis of a liquid crystal molecule 13 is expressed as ⒽⒺ. Each liquid crystal molecule 13 has a dipole moment (P⊥) 14 in a direction perpendicular to the axis thereof. When a voltage higher than a certain threshold level is applied between electrodes formed on the base plates 11 and 11a, a helical structure of the liquid crystal molecule 13 is loosened or unwound to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

The liquid crystal layer in the liquid crystal device of the present invention may be rendered sufficiently thin in thickness (e.g., less than 10μ). As the thickness of the liquid crystal layer is decreased, the helical structure of the liquid crystal molecules is loosened even in the absence of an electric field whereby the dipole moment assumes either of the two states, i.e., P in an upper direction 24 or Pa in a lower direction 24a as shown in FIG. 2. One half of the angle between the molecular axis 23 and the molecular axis 23a is referred to as a tilt angle Ⓗ, which is the same as the apical angle of the corn of the helical structure. When an electric field E or Ea higher than a certain threshold level and different from each other in polarity as shown in FIG. 2 is applied to a cell having the above-mentioned characteristics, the dipole moment is directed either in the upper direction 24 or in the lower direction 24a depending on the vector of the electric field E or Ea. In correspondence with this, the liquid crystal molecules are oriented in either of a first stable state 23 and a second stable state 23a.

When the above-mentioned ferroelectric liquid crystal is used as an optical modulation element, it is possible to obtain two advantages as briefly touched on hereinbefore. First is that the response speed is quite fast. Second is that the orientation of the liquid crystal shows bistability. The second advantage will be further explained, e.g., with reference to FIG. 2. When the electric field E is applied to the liquid crystal molecules, they are oriented in the first stable state 23. This state is kept stable even if the electric field is removed. On the other hand, when the electric field Ea of which direction is opposite to that of the electric field E is applied thereto, the liquid crystal molecules are oriented to the second stable state 23a, whereby the directions of molecules are changed. This state is similarly kept stable even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible.

The most serious problem encountered in forming a device using such a ferroelectric liquid crystal has been, as briefly mentioned hereinbefore, that it is difficult to form a cell having a highly uniform monodomain wherein liquid crystal layers having an SmC* phase are aligned perpendicular to the base plate phases and the liquid crystal molecules are aligned almost in parallel with the base plate phases.

There has been heretofore known a method of applying a monoaxial orientation treatment to base plate surfaces when a large area of a liquid crystal cell is produced. The monoaxial orientation treatment is effected by rubbing the base plate surfaces with velvet, cloth or paper in a single direction or by the oblique or tilt vapor deposition of SiO or $SiO_2$ onto the base plate surfaces. However, such a monoaxial orientation treatment as by the rubbing or the oblique vapor deposition has been considered inappropriate for a ferroelectric liquid crystal since such an orientation treatment per se hinders the bistability of the liquid crystal, based on which driving utilizing a memory characteristic is realized.

According to our further study, it has been found possible to provide a specific bistable state as described hereinafter by applying a suitable monoaxial orientation treatment to base plate surfaces and by arranging a polarizer in the specific axis direction to realize driving effectively utilizing a memory characteristic.

Figure 3B:
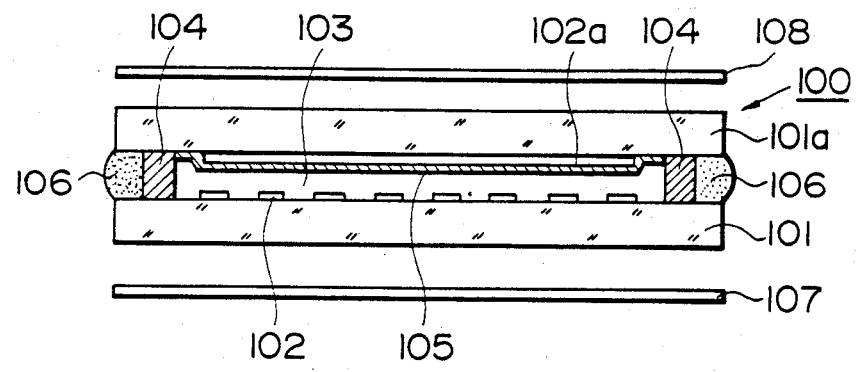
FIG. 3B is a sectional view taken along the line A—A in FIG. 3A.

FIGS. 3A and 3B illustrate an embodiment of the liquid crystal device according to the present invention. FIG. 3A is a plan view of the embodiment and FIG. 3B is a sectional view taken along the line A—A in FIG. 3A.

A cell structure 100 shown in FIG. 3 comprises a pair of base plates 101 and 101a made of glass plates or plastic plates which are held with a predetermined gap with spacers 104 and sealed with an adhesive 106 to form a cell structure. On the base plate 101 is further formed an electrode group (e.g., an electrode group for applying scanning voltages of a matrix electrode structure) comprising a plurality of transparent electrodes 102 in a predetermined pattern, e.g., of a stripe pattern. On the base plate 101 is formed another electrode group (e.g., an electrode group for applying signal voltages of the matrix electrode structure) comprising a plurality of transparent electrodes 102a intersecting with the transparent electrodes 102.

On the base plate 101a provided with such transparent electrodes may be further formed an orientation controlling film 105 composed of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin.

The orientation controlling film 105 may be formed by first forming a film of an inorganic insulating material or an organic insulating material as described above and then rubbing the surface thereof in one direction with velvet, cloth, paper, etc.

In another preferred embodiment according to the present invention, the orientation controlling film 105 may be formed as a film of an inorganic insulating material such as SiO or $SiO_2$ on the base plate 101a by the oblique or tilt vapor deposition.

Figure 8:
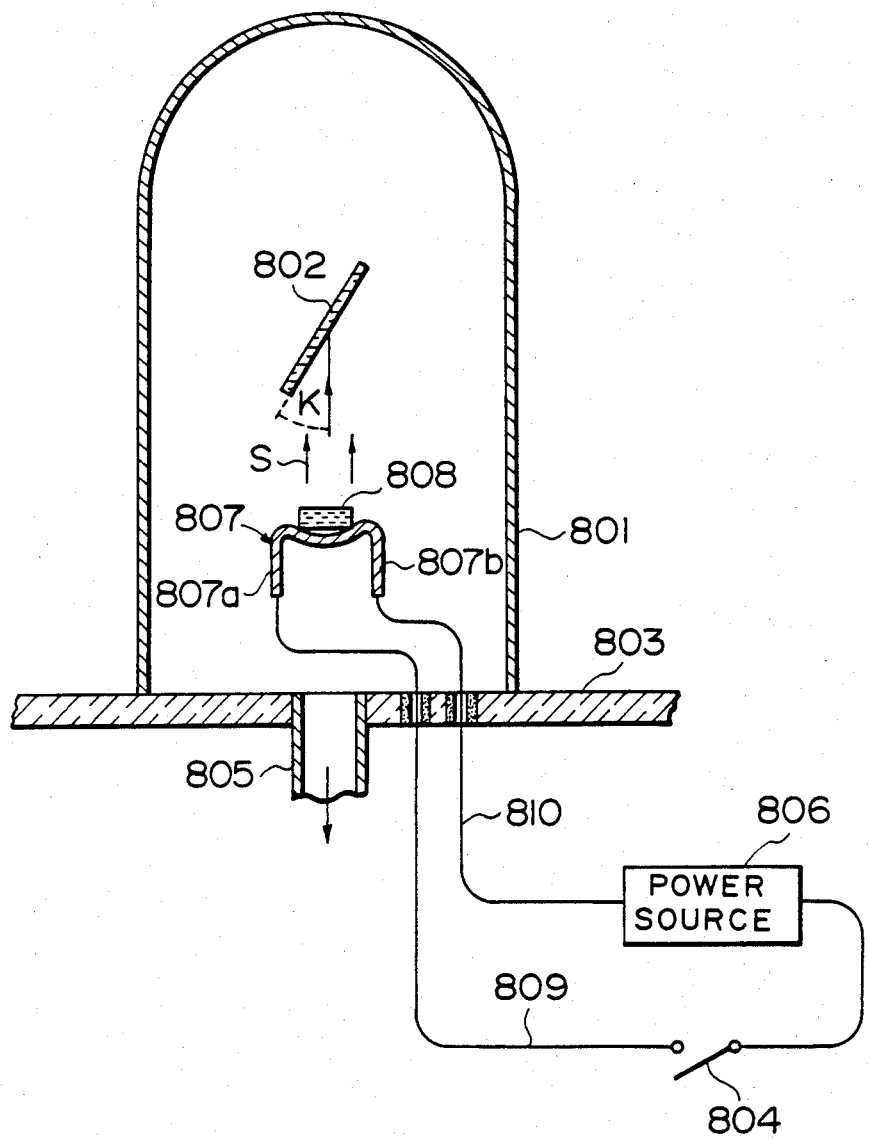
FIG. 8 is a sectional view showing an apparatus for oblique vapor deposition.

In an apparatus shown in FIG. 8, a bell jar 801 is placed on an insulating base plate 803 provided with a suction hole 805 and the bell jar 801 is made vacuum by operating a vacuum pump (not shown) connected to the suction hole 805. A crucible 807 made of tungsten or molybdenum is placed inside and at the bottom of the bell jar 801. In the crucible 807 is placed several grams of a crystal such as SiO, $SiO_2$ or $MgF_2$. The crucible 807 has two downwardly extending arms 807a and 807b, which are respectively connected to lead wires 809 and 810. A power source 806 and a switch 804 are connected in series to the lead wires 809 and 810 outside the bell jar 801. A base plate 802 is disposed inside the bell jar 801 and right above the crucible 807 so that it forms an angle of K with respect to the vertical axis of the bell jar 801.

First, the bell jar 801 is evacuated to a vacuum of about $10^{-5}$ mmHg while the switch 804 is open. Then the switch 804 is closed to supply a power while adjusting an output of the power source 806 until the crucible 807 is heated to an incandescent state of an appropriate temperature for evaporating the crystal 808. About 100 amps. of current is required for giving an appropriate temperature range (700°–1000° C.). The crystal 808 is then evaporated off to form an upward molecular stream denoted by S in the figure. The stream S is incident on the base plate 502 with an angle thereto of K to coat the base plate 802. The angle K is the above mentioned incident angle and the direction of the stream S is the "oblique or tilt vapor deposition direction". The thickness of the film is determined based on the calibration of the thickness with respect to the operation time which is effected prior to the introduction of the base plate 802 into the bell jar 801. After an appropriate thickness of the film is formed, a power supply from the source 806 is decreased, the switch 804 is opened, and the bell jar 801 and the interior thereof are cooled. Then, the pressure in the bell jar is raised to atmospheric pressure and the base plate 802 is taken out from the bell jar 801.

In still another embodiment, the orientation controlling film 105 may be formed by first forming a uniform film of the above-mentioned inorganic or organic insulating material on, i.e., in contact with or above, the base plate 101a and then subjecting the surface of the film to the oblique or tilt etching to provide the surface with an orientation controlling effect.

It is preferred that the orientation controlling film 105 is also caused to function as an insulating film. For this purpose, the orientation controlling film may preferably have a thickness in the range of 100 Å to 1μ, especially 500 to 5000 Å. The insulating film also has a function of preventing the occurrence of an electric current which is generally caused due to minor quantities of impurities contained in the liquid crystal layer 103, whereby deterioration of the liquid crystal compounds is prevented even on repeating operations.

In the liquid crystal device according to the present invention, it is possible to form an orientation controlling film similar to the orientation controlling film 105 also on the other base plate 101.

A similar orientation controlling effect can also be imparted to the side walls of spacers 104 in the structure shown in FIG. 3, for example, by rubbing.

In the cell structure shown in FIG. 3, the liquid crystal layer 103 may be formed into a chiral smectic phase such as SmC* phase. The liquid crystal layer 103 is sufficiently thin and the liquid crystal molecules therein do not assume a helical structure.

Figure 4:
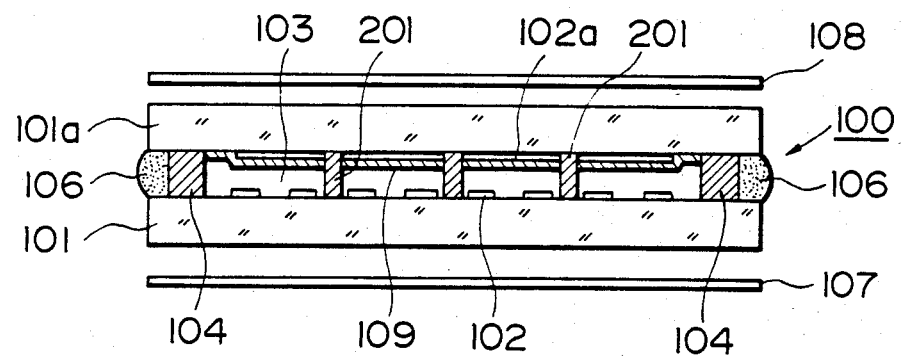
FIG. 4 is a sectional view showing another embodiment of the liquid crystal optical device according to the present invention.

FIG. 4 shows another embodiment of the liquid crystal device according to the present invention. In the liquid crystal device shown in FIG. 4, a plurality of spacer members 201 are disposed between a pair of base plates 101 and 101a. The spacer members 201 can be provided by forming a film of an inorganic compound such as SiO, $SiO_2$, $Al_2O_3$ and $TiO_2$, or a resin such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin and a photoresist resin, and by etching the film to leave the spacer members 201 at appropriate parts.

Such a cell structure 100 having base plates 101 and 101a as shown in FIG. 3 or FIG. 4 is sandwiched between a pair of polarizers 107 and 108 to form an optical modulation device causing optical modulation when a voltage is applied between electrodes 102 and 102a.

Next, the process for producing the liquid crystal device according to the present invention is explained with reference to FIGS. 3 and 5 and a biphenyl ester type liquid crystal as an example of the liquid crystal material. The biphenyl ester type liquid crystal shows the following phase transition.

Iso. (isotropic phase) $\xrightarrow{72^\circ C.}$ Ch. (cholesteric phase) $\longrightarrow$ SmA (smectic A phase) $\xrightarrow{50^\circ C.}$ SmC* $\xrightarrow{20^\circ C.}$ Cry. (crystal phase)

When the liquid crystal layer has a sufficiently large thickness (about 100μ), the SmC* phase assumes a helical structure and the pitch is about 4μ.

First, a cell 100 containing the above mentioned biphenyl ester type liquid crystal is set in such a heating case (not shown) that the whole cell 100 is uniformly heated therein. When, the cell 100 is heated to a temperature (about 75° C.) where the liquid crystal in the cell assumes an isotropic phase. The temperature of the heating case is decreased whereby the liquid crystal in the cell 100 is subjected to a temperature decreasing stage. In the temperature decreasing stage, the liquid crystal in the isotropic phase is transformed at about 72° C. into a cholesteric phase having a grandjean texture and, on further cooling, transformed from the cholesteric phase to an SmA phase which is a monoaxially anisotropic phase at about 60° C. Herein, the axes of the liquid crystal molecules in the SmA phase are aligned in the rubbing direction.

Then, the liquid crystal in the SmA phase is transformed into an SmC* phase on further cooling, whereby a monodomain of SmC* phase with a non-spiral structure is formed if the cell thickness is of the order of, for example, 3 μm or less.

Figure 5:
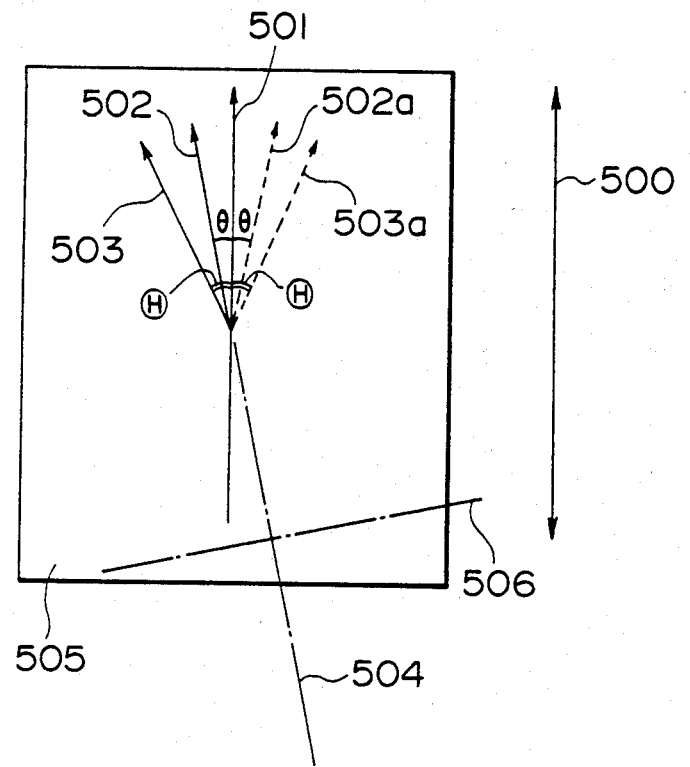
FIG. 5 is a schematic plan view illustrating the orientation of the liquid crystal molecules in the present invention.

FIG. 5 is a schematic plan view illustrating the states of orientation of liquid crystal molecules as viewed from above the base plate face 505.

In the figure, the two-head arrow 500 indicates a direction of a monoaxial orientation treatment, i.e., the direction of rubbing in this embodiment. In the SmA phase, liquid crystal molecules are oriented or aligned in an average molecular axis direction 501 which coincides with the rubbing direction 500. In the SmC* phase, the average molecular axis direction of the liquid crystal molecules is tilted to a direction 502, so that the rubbing direction 500 and the average molecular axis direction 502 forms an angle θ to result in a first stable orientation state. When a voltage is applied between a pair of base plates in this stage, the average molecular axis direction of the liquid crystal molecules in the SmC* phase is changed to a saturation angle θ larger than the angle $\bigoplus$, where a third stable orientation state is attained. The average molecular axis direction at this time is denoted by a reference numeral 503. When the voltage is then returned to zero, the liquid crystal molecules are returned to the former first molecular axis direction 502. Accordingly, the liquid crystal molecules have a memory characteristic in the state of the first molecular axis direction 502. When a voltage of the opposite polarity is applied in the state of the molecular axis direction 502 and the voltage is sufficiently high, the average molecular axis direction of the liquid crystal molecules is shifted to and saturated at a fourth stable orientation state giving an average molecular axis direction 503a. Then, when the voltage is returned to zero, the liquid crystal molecules are returned to and settled at the second stable state giving the average molecular axis direction 502a. As a result, when the polarizing direction 504 of one polarizer is set in the same direction as the molecular axis direction 502 forming the angle θ, an optical contrast between an ON state and an OFF state can be improved in a driving method utilizing an orientation between the first and second stable orientation states and the memory characteristics.

Figure 6:
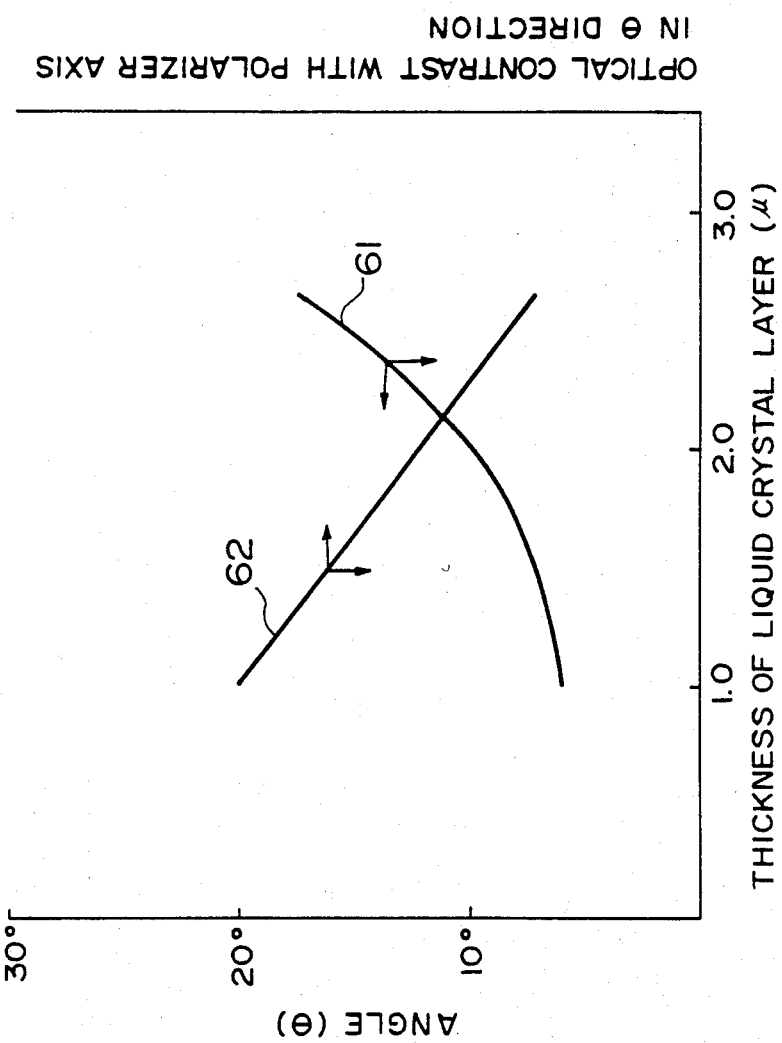
FIGS. 6 and 7 respectively are explanatory views showing the dependency of the angle $\theta$ formed between the direction of monoaxial orientation treatment and average molecular axis direction, and the optical contrast on the thickness of the liquid crystal layer.

FIG. 6 shows an example of dependency of the angle θ between the direction of the monoaxial orientation treatment and the average molecular axis direction and the optical contrast ratio between the molecular axis states 502 and 502a measured under the condition when the axis of the axis of a polarizer is arranged in the direction of θ on the thickness of the liquid crystal layer in the case of the SmC* phase of the abovementioned biphenyl ester type liquid crystal. According as the thickness of the liquid crystal layer decreases, the value of the angle θ decreases according to the curve 61 and the contrast increases according to the curve 62. The measurement was carried out at a temperature lower than the SmA→SmC* phase transition temperature by 20° C. The angle $\bigoplus$ given by the average molecular axis direction under a sufficient electric field (e.g., 20–30 V) was 25° where the liquid crystal layer thickness was 1.2μ, 28° where the thickness was 2.6μ and 30° where the liquid crystal layer was sufficiently thick (about 100μ).

Figure 7:
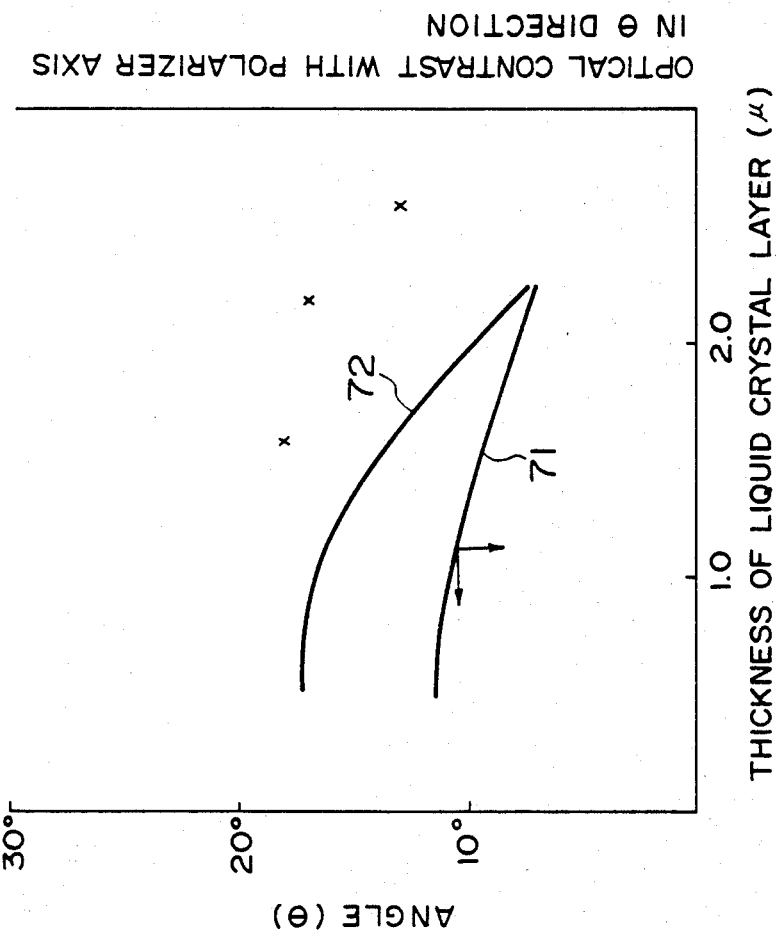

FIG. 7 shows measured data showing dependency of the angle θ between the direction of the monoaxial orientation treatment and the average molecular axis direction and the optical contrast ratio between the molecular axis states 502 and 502a for the SmC* phase of an azomethine liquid crystal. The liquid crystal shows the following phase transition:

Cry. $\xrightarrow{76^\circ C.}$ SmC* $\xrightarrow{93^\circ C.}$ SmA $\xrightarrow{118^\circ C.}$ Iso.

The helical pitch was about 2μ. In the case of this liquid crystal, according as the liquid crystal layer thickness decreases, the angle $\bigoplus$ increases according to the curver 71 and the optical contrast increases according to the curve 72. The measurement was carried out at a temperature lower than the SmA→SmC* phase transition temperature by 15° C.

The angle θ given by the average molecular axis direction under a sufficient electric field (20–30 V) was 14° where the liquid crystal layer thickness was 1μ, 15° where the thickness was 2μ and 18° where the layer was sufficiently thick (about 100μ). The points with symbol X correspond to the data given by K. Kondo et al., J.J.AP. 22 (1983) L294 which were obtained under the condition where no orientation treatment had been applied to the base plates and gave larger values of θ compared with our data which were obtained with orientation-treated base plates. Thus, it is clear that the orientation treatment gave a remarkable influence on the state of orientation of liquid crystal molecules.

As is understood from a characteristic of the present invention that a specific stable state of angle $\theta$ is provided to liquid crystal molecules by orientation treatment of a base plate surface, the value of the angle $\theta$ varies depending on the degree of the orientation treatment applied onto the base plate surfaces. More specifically, if the treatment applies a large force of constraint onto liquid crystal molecules, the angle $\theta$ becomes small. If the treatment applies a small force of constraint, the angle $\theta$ becomes large. If the constraint force is too large, the angle $\theta$ becomes extremely small, so that the driving making use of the memory characteristic of the SmC* phase becomes practically impossible. Accordingly, the conditions for the orientation treatment should preferably give an angle $\theta$ satisfying the relationships of $1/10 \cdot \textcircled{H} < \theta$.

Figure 9A:
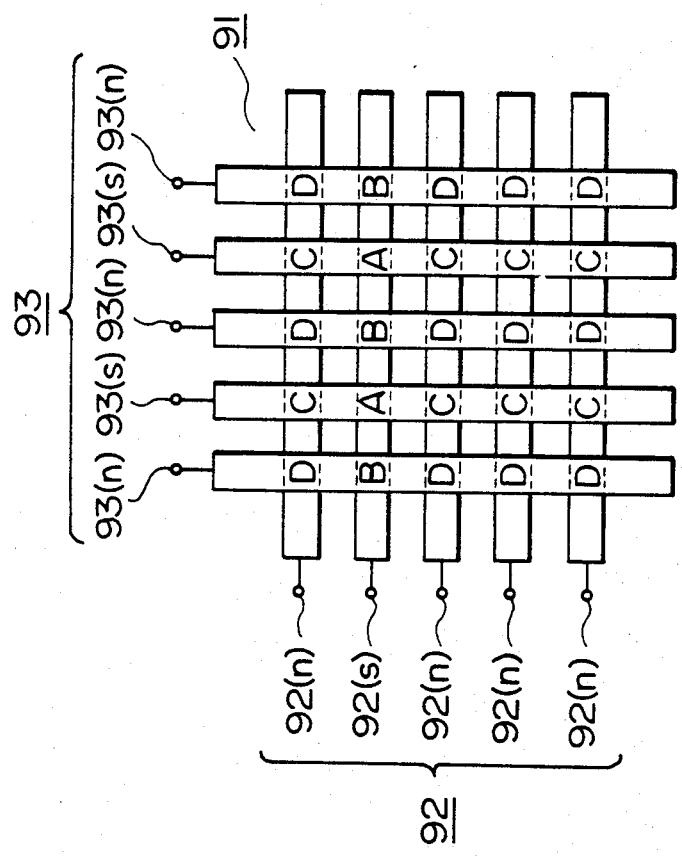
FIG. 9AA is a schematic plan view showing an electrode arrangement of a liquid crystal device accoding to the present invention, FIG. 9AB illustrates a signal applied to a selected scanning electrode, FIG. 9AC illustrates a signal applied to a nonselected scanning electrode, FIG. 9AD illustrates an information signal applied to a selected signal electrode, FIG. 9AE illustrates an information signal applied to a nonselected signal electrode.
Figure 9A:
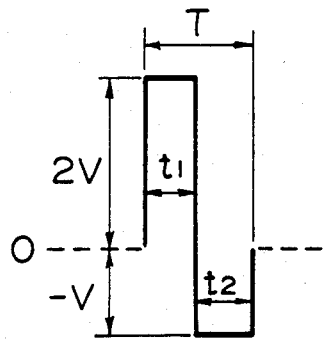
Figure 9A:
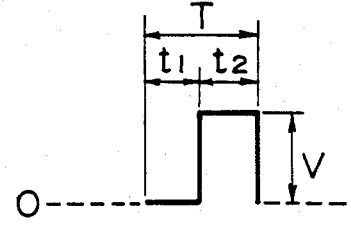
Figure 9A:
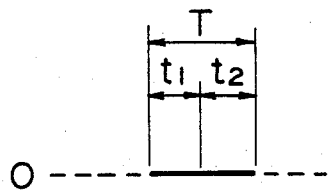
Figure 9A:
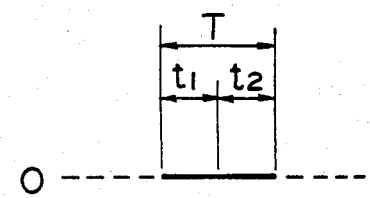
Figure 9B:
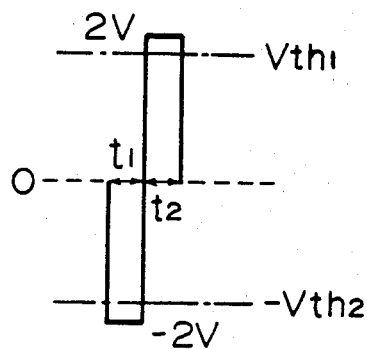
FIG. 9BA illustrates a voltage waveform applied to the liquid crystal in a picture element A, FIG. 9BB in a picture element B, FIG. 9BC in a picture element C, and FIG. 9BD in a picture element D.
Figure 9B:
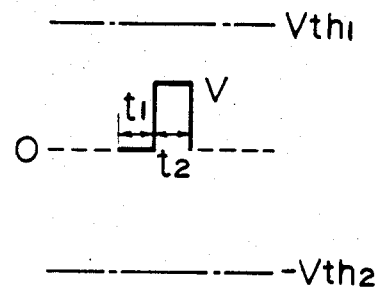
Figure 9B:
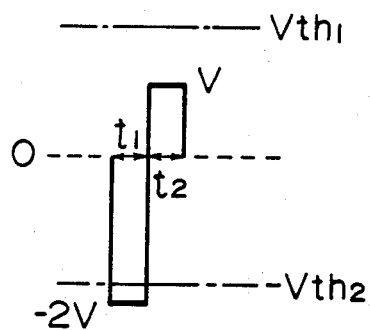
Figure 9B:
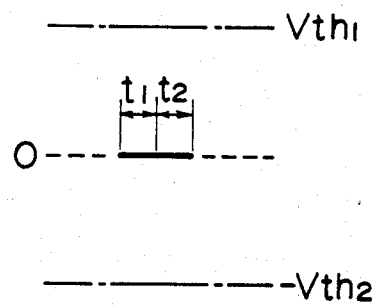

The liquid crystal device according to the present invention is driven in the following manner. Referring to FIG. 9AA, there is schematically shown an example of a cell 91 having a matrix electrode arrangement in which a ferroelectric liquid crystal compound is interposed between a pair of groups of electrodes oppositely spaced from each other. Reference numerals 92 and 93 respectively denote a group of scanning electrodes to which scanning signals are applied and a group of signal electrodes to which information signals are applied. Referring to FIGS. 9AB and 9AC, there are respectively shown electric signals applied to a selected scanning electrode 92(s) and electric signals applied to the other scanning electrodes (non-selected scanning electrodes) 92(n). On the other hand, FIGS. 9AD and 9AE show electric signals with information applied to the selected signal electrode 93(s) and electric signals with no information applied to the non-selected signal electrodes 93(n), respectively. In FIGS. 9AB to 9AE, the abscissa and the ordinate represent a time and a voltage, respectively. For instance, when displaying a motion picture, the group of scanning electrodes 92 are sequentially and periodically selected. If a threshold voltage for giving a first stable state of the liquid crystal having bistability is referred to as $V_{th1}$ and a threshold voltage for giving a second stable state thereof as $-V_{th2}$, an electric signal applied to the selected scanning electrode 92(s) is an alternating voltage showing 2V at a phase (time) $t_1$ and $-V$ at a phase (time) $t_2$, as shown in FIG. 9AB. The other scanning electrodes 92(n) are grounded and a zero signal is given thereto as shown in FIG. 9AC. On the other hand, an electric signal applied to the selected signal electrode 93(s) shows 0 at phase $t_1$ and V at phase $t_2$ as indicated in FIG. 9AD, while an electric signal applied to the non-selected signal electrodes 43(n) shows 0 as indicated in FIG. 9AE. In this instance, the voltage V is set to a desired value which satisfies $V < V_{th1} < 2V$ and $-V > -V_{th2} > -2V$. Voltage waveforms applied to each picture element when such electric signals are given are shown in FIG. 9B. Waveforms shown in FIGS. 9BA, 9BB, 9BC and 9BD correspond to picture elements A, B, C and D shown in FIG. 9AA, respectively. Namely, as seen from FIGS. 9BA and 9BB, a voltage of $-2V$ exceeding the threshold level $-V_{th2}$ is applied to all the picture elements on the selected scanning line at a phase of $t_1$, so that these picture elements are uniformly brought to one optically stable state (the second stable state). Among these, a voltage of 2V above the threshold level $V_{th1}$ is applied to the picture elements A to which an information signal is given at a phase of $t_2$, so that the picture elements are shifted to the other optically stable state (the first stable state). Accordingly, depending upon whether a signal electrode is selected or not on a selected scanning electrode line, the orientation of liquid crystal molecules changes. On the other hand, a voltage of V not exceeding the threshold level $V_{th1}$ is applied to the picture elements B to which no information signal is given on the same scanning line at the second phase $t_2$ so that the picture elements B remain in the above mentioned one optically stable state.

On the other hand, as indicated by the picture elements C and D on the non-selected scanning lines, a voltage applied to all picture elements C and D is $+V$ or 0, each not exceeding the threshold level. Accordingly, the liquid crystal molecules in each of picture elements C and D are placed in the orientations corresponding to signal states produced when they have been last scanned without change in orientation. Namely, when a certain scanning electrode is selected, all the picture elements on the selected scanning line are once brought to one optically stable state at a first phase $t_1$ and some of them are brought to the other optically stable state at a second phase $t_2$ thereby to write one line of signals. The signal state of each picture element thus formed can be maintained until one frame (or one field) is completed and the line is subsequently selected. Accordingly, even if the number of scanning lines increases, the duty ratio does not substantially change, resulting in no possibility of lowering in contrast, occurrence of crosstalk, etc.

In this instance, the magnitude of the voltage V and length of the phase $(t_1+t_2)=T$ (writing pulse) usually ranges from 3 to 70 volts and from 0.1 $\mu$sec. to 2 msec, respectively, although they change depending upon the liquid crystal material or the thickness of a cell used.

In order to effectively accomplish the driving method of the present invention, it would be apparent that electric signals to be applied to scanning electrodes or signal electrodes need not be simple rectangular wave signals. For example, signals with a sine waveform or triangular waveform may also be used for driving.

FIGS. 10 illustrate another embodiment of driving. This embodiment is different from the one shown in FIGS. 9 in that the voltage 2V applied to the selected scanning electrode 92(s) at phase $t_1$ in the embodiment of FIGS. 9 is reduced to a half, i.e., V and, correspondingly thereto, a voltage of $-V$ is applied to all the signal electrodes at phase $t_1$. This embodiment provides an advantage that the maximum voltage applied to the respective electrodes is reduced to one half compared with that applied in the embodiment of FIGS. 9.

Figure 10A:
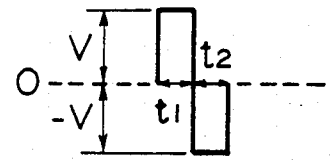
FIG. 10AA illustrates a signal applied to a selected scanning electrode in another embodiment, FIG. 10AB to a nonselected scanning electrode, FIG. 10AC to a selected signal electrode, and FIG. 10AD to a nonselected signal electrode.
Figure 10A:
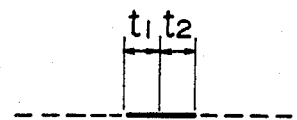
Figure 10A:
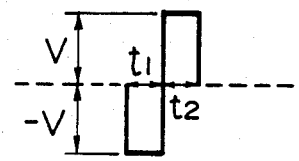
Figure 10A:
Figure 10B:
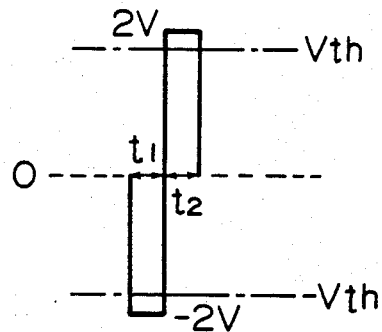
FIG. 10BA illustrates a voltage waveform applied to the liquid crystal in a picture element A in the abovementioned another embodiment, FIG. 10BB in a picture element B, FIG. 10BC in a picture element C, and FIG. 10BD in a picture element D.
Figure 10B:
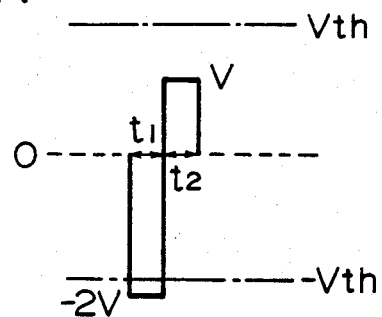
Figure 10B:
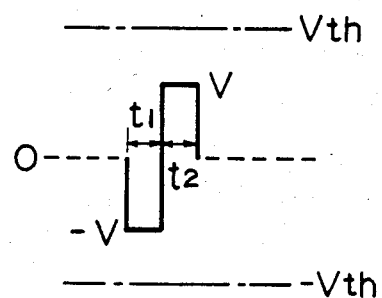
Figure 10B:
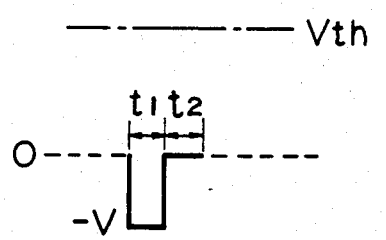
Figure 11A:
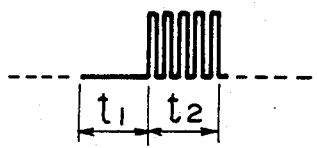
FIGS. 11A, 11B, 11C and 11D respectively illustrate an example of voltage waveforms applied to signal electrodes.
Figure 11B:
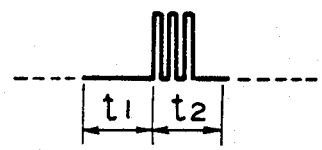
Figure 11C:
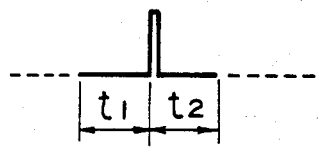
Figure 11D:
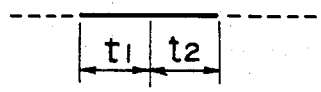

More specifically, FIG. 10AA shows a voltage waveform applied to a selected scanning electrode 92(s) while nonselected scanning electrodes 92(n) are grounded and an electric signal of 0 volt is applied thereto as shown in FIG. 10AB. FIG. 10AC shows a voltage waveform applied to selected signal electrodes 93(s) and FIG. 10AD shows a voltage waveform applied to nonselected signal electrodes. FIGS. 10BA–10BD show voltage waveforms applied to picture elements A, B, C and D, respectively, shown in FIG. 9AA.

In the foregoing explanation of the present invention, it has been assumed that liquid crystal molecules forming one picture element are uniform and oriented to either one stable state throughout the entire region of one picture element. The orientation behavior of a ferroelectric liquid crystal is however very delicately affected by the interaction with the base plate surface. As a result, when a difference between the applied voltage and a threshold voltage $V_{th1}$ or $-V_{th2}$ is small, a state where liquid crystal molecules having opposite stable states are present in mixture can be formed in a region of one picture element due to a small degree of local difference in base plate surfaces. By utilizing this phenomenon, it is possible to apply a signal for giving a gradation in the second phase of information signal. For example, in the driving method explained with reference to FIGS. 9, it is possible to provide a gradtional image by applying to signal electrodes pulse information signals with different numbers of pulses at a phase $t_2$ as shown in FIGS. 11A–11D, while the same scanning signals are applied as in the embodiment of FIGS. 9.

The present invention will be further explained with reference to a working example and comparative examples.

EXAMPLE 1

On a square glass base plate were formed ITO (Indium-Tin-Oxide) electrode films in the form of stripes with a width of 62.5 μm at a pitch of 100 μm. In an apparatus for the oblique vapor deposition as shown in FIG. 8, the base plate was disposed with its face having the ITO film being directed downward and a crystal of $SiO_2$ was set in a crucible of molybdenum. Then the vapor deposition apparatus was evacuated to a vacuum of the order of $10^{-5}$ mmHg and $SiO_2$ was obliquely vapor-deposited in a prescribed manner to form an electrode plate with an 800 μ-thick oblique vapor deposition film (A electrode plate).

On the other hand, on a similar glass plate provided with stripe-form ITO electrode films was applied a polyimide-forming solution ("PIQ": polyimideisoindolquinazoline-dione, produced by Hitachi Kasei Kogyo K.K.; Non-volatile content: 14.5 wt. %) by means of a spinner coater, which was then heated at 120° C. for 30 minutes to form a film of 800 Å in thickness (B electrode plate).

Then, a heat-setting epoxy adhesive was applied to the periphery of the A electrode plate except for the portion forming an injection port by screen printing process. The A electrode plate and the B electrode plate were superposed with each other so that their stripe-pattern electrodes crossed each other with right angles and secured to each other with a polyimide spacer while leaving the gap of 2μ therebetween.

Through the injection port of the thus formed cell was injected the above-mentioned biphenyl ester type liquid crystal in the isotropic phase into the cell, and the injection port was sealed. The liquid crystal cell thus formed was gradually cooled and sandwiched between a pair of polarizers arranged in the cross nicol relationship while it was maintained at a constant temperature of about 30° C. The liquid crystal cell was observed through a microscope, whereby an SmC* phase of a nonhelical structure was found to be formed while giving an angle θ of about 10°. On the other hand, the angle Ⓗ was about 23°. Then, the pair of polarizers was so disposed that the axis of one polarizer coincided with the direction of the angle θ from the direction of the monoaxial orientation treatment by the oblique vapor deposition while retaining the cross nicol relationship thereby to form a liquid crystal device. When the liquid crystal device was driven in the manner explained above with reference to FIGS. 9 where V was 10 volts, it was found possible to obtain good memory driving characteristics. An optical contrast of 15:1 was obtained.

COMPARATIVE EXAMPLE 1

The liquid crystal cell of Example 1 was sandwiched between a pair of polarizers arranged in the cross nicol relationship so that the axis of one polarizer coincided with the direction of the monoaxial orientation treatment. The resultant optical device was driven in the same manner as in Example 1, whereby an optical contrast of 1:1 was obtained.

COMPARATIVE EXAMPLE 2

The liquid crystal cell of Example 1 was sandwiched between a pair of polarizers arranged in the cross nicol relationship so that the axis of one polarizer coincided with the direction of the angle θ from the direction of the monoaxial orientation treatment. The resultant optical device was driven in the same manner as in Example 1, whereby an optical contrast of 3:1 was obtained.

What is claimed is:

1. In a liquid crystal optical device comprising at least one polarizer, and a cell structure including a pair of base plates having electrodes thereon and a ferroelectric liquid crystal disposed between the base plates, said cell structure having been subjected to a monoaxial orientation treatment; the improvement wherein:
    said ferroelectric liquid crystal is disposed in a layer thin enough to release its own helical structure, and
    said polarizer is arranged such that the angle between the polarizing direction of the polarizer and the axial direction of the monoaxial orientation treatment is smaller than the angle between the axial direction of the monoaxial treatment and an average molecular axis direction of the ferroelectric liquid crystal under application of a polarity of voltage between the electrodes.

2. The liquid crystal device according to claim 1, wherein the ferroelectric liquid crystal shows a cholesteric phase at a high temperature.

3. The liquid crystal device according to claim 1, which comprises a pair of polarizers sandwiching the cell structure and arranged in the form of cross nicols.

4. The liquid crystal device according to claim 1, wherein said monoaxial orientation treatment is a rubbing treatment.

5. The liquid crystal device according to claim 1, wherein said monoaxial orientation treatment is an oblique vapor deposition treatment.

6. The liquid crystal device according to claim 1, wherein said ferroelectric liquid crystal is a chiral smectic liquid crystal.

7. The liquid crystal device according to claim 6, wherein said chiral smectic phase is chiral smectic C phase, chiral smectic G phase, chiral smectic F phase, chirasl smectic I phase, chiral smectic J phase, chiral smectic K phase, or chiral smectic H phase.

8. The liquid crystal device according to claim 6, wherein the ferroelectric liquid crystal is formed in a layer having a thickness smaller than the pitch of the helical structure thereof.

9. A liquid crystal optical device comprising a pair of base plates each provided with an electrode, a ferroelectric liquid crystal sealed between said pair of base plates, and at least one polarizer, wherein
    at least one of said base plates is provided with a monoaxial orientation axis, said ferroelectric liquid crystal gives an average molecular axis direction forming an angle Ⓗ from the monoaxial orientation axis under application of a polarity of voltage, and said ferroelectric liquid crystal gives an average molecular axis direction forming an angle θ from the monoaxial orientation axis under the application of zero-voltage, the angle θ being smaller than Ⓗ, and said polarizer is arranged such that the polarizing axis thereof is substantially parallel with the average molecular axis direction of the ferroelectric liquid crystal giving the angle θ.

10. The device according to claim 9, wherein said monoaxial orientation treatment is a rubbing treatment.

11. The device according to claim 9, wherein said monoaxial treatment is an oblique vapor deposition treatment.

12. The device according to claim 9, wherein said angles Ⓗ and θ satisfy the relationship of $1/10 \times Ⓗ < \theta$.

13. The device according to claim 9, wherein said ferroelectric liquid crystal is in a smectic phase.

14. The device according to claim 13, wherein said smectic phase is a chiral smectic phase.

15. The device according to claim 4, wherein said chiral smectic phase is chiral smectic C phase, chiral smectic G phase, chiral smectic F phase, chiral smectic I phase, chiral smectic J phase, chiral smectic K phase or chiral smectic H phase.

16. The device according to claim 9, wherein said ferroelectric liquid crystal is formed in a layer having a thickness thinner than the pitch of the helical structure of the ferroelectric liquid crystal.

17. The device according to claim 9, wherein said ferroelectric liquid crystal shows a choelestric phase at a high temperature.

18. The device according to claim 9, wherein said at least one polarizer is provided in a pair sandwitching the pair of base plates and with their polarizing directions arranged in a cross nicol relationship.

19. The device according to claim 9, wherein said ferroelectric liquid crystal provides a different monoaxially anisotropic phase having an axial direction through phase transition thereof, and said monoaxial orientation axis is provided in a direction substantially parallel with the axis direction of said different monoaxially anisotropic phase.

20. The device according to claim 19, wherein said different monoaxially anisotropic phase is a smectic A phase.

21. A liquid crystal optical device comprising a plurality of picture elements arranged in a plurality of rows, which device is driven by applying a writing signal row by row to the picture elements and the written states of the picture elements in the row to which the writing signal has been applied are retained until a subsequent writing signal is applied to the row, wherein each of said plurality of picture elements is formed by a pair of opposite electrodes, a ferroelectric liquid crystal interposed between the opposite electrodes and at least one polarizer disposed on the side of one of the opposite electrodes opposite to the ferroelectric liquid crystal, said ferroelectric liquid crystal is disposed between a pair of base plates each having one of said pair of opposite electrodes, and at least one of said pair of base plates is provided with a monoaxial orientation axis, said ferroelectric liquid crystal having a first orientation state and a second orientation state with respect to an electric field applied thereto, said ferroelectric liquid crystal gives an average molecular axis direction forming an angle Ⓗ from the monoaxial orientation axis under application of a writing signal of a polarity of voltage, said ferroelectric liquid crystal further gives an average molecular axis direction forming an angle θ from the monoaxial orientation axis under the memory state after the application of the writing signal, the angle θ being smaller than Ⓗ, and said one polarizer is arranged such that the polarizing axis thereof is substantially parallel with the average molecular axis direction of the ferroelectric liquid crystal giving the angle θ.

22. The device according to claim 21, wherein said angles Ⓗ and θ satisfy the relationship of $1/10 \times Ⓗ < \theta$.

23. The device according to claim 21, wherein said writing signal applied to a row of picture element is a pulse signal having a pulse width in the range of 0.1 μsec to 2 msec.

24. The device according to claim 23, wherein said pulse signal is in the form of a rectangular wave, sine wave or triangular wave.

25. The device according to claim 21, wherein said writing signal applied to a row of picture elements has a voltage in the range of 3 to 70 volts.

26. The device according to claim 21, wherein the time period between said writing signal and said subsequent writing signal is equal to a period of one frame or one field.

27. The device according to claim 21, wherein a plurality of pairs of said opposite electrodes form a matrix electrode structure comprising a group of scanning electrodes and a group of signal electrodes intersecting with the scanning electrodes, each intersection of the scanning electrodes and the signal electrodes forming a picture element.

28. The device according to claim 21, wherein said at least one polarizer is provide in pair sandwiching the opposite electrodes and with their polarizing directions arranged in a cross nicol relationship.

29. The liquid crystal optical device according to claim 21, which is driven by the combination of a first phase of applying a first voltage signal for orienting the ferroelectric liquid crystal to the first stable orientation and a second phase of applying a second voltage signal for orienting the ferroelectric liquid crystal to the second stable orientation; said first and second voltage signals having mutually opposite polarities.

30. The device according to claim 21, wherein said ferroelectric liquid crystal provides a different monoaxially anisotropic phase having an axial direction through phase transition thereof, and said monoaxial orientation axis is provided in a direction substantially parallel with the axis direction of said different monoaxially anisotropic phase.

* * * * *

UNITED STATES PATENT AND TRADEMARK OFFICE
CERTIFICATE OF CORRECTION

PATENT NO. : 4,712,873

DATED : December 15, 1987

INVENTOR(S) : JUNICHIRO KANBE, ET AL.

Page 1 of 2

It is certified that error appears in the above-identified patent and that said Letters Patent is hereby corrected as shown below:

AT [57] IN THE ABSTRACT

Line 15, "angle Ⓗ" should read --angle θ--.
Line 16, "than θ," should read --than Ⓗ ,--.
Line 17, "in" should be deleted.

COLUMN 8

Line 11, "502" should read --802--.

COLUMN 9

Line 60, "angle θ" should read --angle Ⓗ --.
Line 61, "angle Ⓗ," should read --angle θ,--.

COLUMN 10

Line 50, "angle Ⓗ" should read --angle θ--.
Line 55, "angle θ" should read --angle Ⓗ --.

COLUMN 14

Line 57, "chirasl" should read --chiral--.

UNITED STATES PATENT AND TRADEMARK OFFICE
CERTIFICATE OF CORRECTION

PATENT NO. : 4,712,873
DATED : December 15, 1987
INVENTOR(S) : JUNICHIRO KANBE, ET AL.

It is certified that error appears in the above-identified patent and that said Letters Patent is hereby corrected as shown below:

COLUMN 15

```
Line 6,  "angle H "  should read --angle θ--.
Line 8,  "angle H "  should read --angle θ--.
Line 12, "angle H ." should read --angle θ.--.
Line 26, "claim 4,"  should read --claim 14,--.
Line 36, "choelestric" should read --cholesteric--.
Line 39, "sandwitching" should read --sandwiching--.
```

COLUMN 16

```
Line 23, "θsatisfy" should read --θ satisfy--.
Line 26, "element" should read --elements--.
Line 47, "provide" should read --provided--.
```

Signed and Sealed this

Twenty-sixth Day of July, 1988

*Attest:*

DONALD J. QUIGG

*Attesting Officer*   *Commissioner of Patents and Trademarks*